(12) United States Patent
Poledna et al.

(10) Patent No.: US 10,346,242 B2
(45) Date of Patent: Jul. 9, 2019

(54) DISTRIBUTED REAL-TIME COMPUTER SYSTEM AND TIME-TRIGGERED DISTRIBUTION UNIT

(71) Applicant: FTS COMPUTERTECHNIK GMBH, Vienna (AT)

(72) Inventors: Stefan Poledna, Klosterneuburg (AT); Hermann Kopetz, Baden (AT)

(73) Assignee: TTTech Computertechnik AG, Vienna (AT)

( * ) Notice: Subject to any disclaimer, the term of this patent is extended or adjusted under 35 U.S.C. 154(b) by 64 days.

(21) Appl. No.: 15/514,578

(22) PCT Filed: Sep. 28, 2015

(86) PCT No.: PCT/AT2015/050238
§ 371 (c)(1),
(2) Date: Mar. 27, 2017

(87) PCT Pub. No.: WO2016/049670
PCT Pub. Date: Apr. 7, 2016

(65) Prior Publication Data
US 2017/0228281 A1 Aug. 10, 2017

(30) Foreign Application Priority Data
Oct. 1, 2014 (AT) .............................. A 50697/2014

(51) Int. Cl.
*G06F 11/00* (2006.01)
*G06F 11/07* (2006.01)
(Continued)

(52) U.S. Cl.
CPC ........ *G06F 11/0796* (2013.01); *G06F 11/165* (2013.01); *G06F 11/1645* (2013.01); *G06F 11/185* (2013.01); *G06F 2201/805* (2013.01)

(58) Field of Classification Search
CPC ............. G06F 11/0796; G06F 11/1608; G06F 11/1616; G06F 11/1625; G06F 11/1629;
(Continued)

(56) References Cited

U.S. PATENT DOCUMENTS 5,694,542 A * 12/1997 Kopetz ................... G06F 11/10
714/47.1
7,124,316 B2 10/2006 Kopetz et al.
(Continued)

FOREIGN PATENT DOCUMENTS

WO 2012/130241 A1 10/2012

OTHER PUBLICATIONS

TTEthernet—A Powerful Network Solution for All Purposes, 2010, TTTech, pp. 1-15 (Year: 2010).*
(Continued)

*Primary Examiner* — Marc Duncan
(74) *Attorney, Agent, or Firm* — Eversheds Sutherland (US) LLP

(57) ABSTRACT

The invention relates to a time-controlled distribution unit (30, 31) for the distribution of messages in a distributed computer system for safety-critical applications. Said distribution unit is designed as a self-testing functional unit and comprises input channels (201 . . . 222) for receiving time-controlled periodic input messages from node computers (20, 21, 22) upstream in the data flow, and output channels (301 . . . 333) for transmitting time-controlled periodic output messages to the node computers (50, 51, 52) downstream in the data flow, a computer (40) being provided in the distribution unit and being designed to analyze, by means of a "simple" software, useful information contained in the input messages, and to decide whether output messages are output and, if so, which useful information is contained in the output messages.

4 Claims, 2 Drawing Sheets

Figure 1:
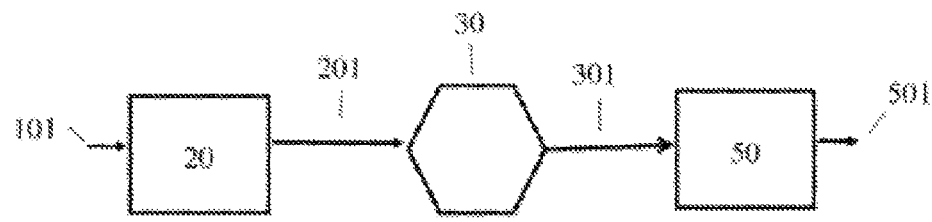

(51) Int. Cl.
*G06F 11/18* (2006.01)
*G06F 11/16* (2006.01)

(58) Field of Classification Search
CPC ............. G06F 11/1641; G06F 11/1645; G06F 11/165; G06F 11/1654; G06F 11/183; G06F 11/185; G06F 2201/805
See application file for complete search history.

(56) References Cited

U.S. PATENT DOCUMENTS

| | | | |
|---|---|---|---|
| 7,146,405 B2 | 12/2006 | Hermann | |
| 8,503,484 B2* | 8/2013 | Bonk | G06F 1/14 |
| | | | 370/503 |
| 8,797,842 B2* | 8/2014 | Dame | H04L 12/40026 |
| | | | 361/601 |
| 9,575,859 B2 | 2/2017 | Poledna | |
| 2013/0086432 A1* | 4/2013 | Bauer | G06F 1/14 |
| | | | 714/47.3 |
| 2016/0232126 A1* | 8/2016 | Poledna | G06F 15/17331 |

OTHER PUBLICATIONS

Kopetz et al., "The Time-Triggered Architecture," Proceedings of the IEEE, New York, NY, 2003, vol. 91, No. 1, pp. 112-126. doi: 10.1109/JPROC.2002.805821.
Search Report issued in Austrian application No. A 50697/2014, completed Aug. 19, 2015.
International Search Report for PCT/AT2015/050238, dated Mar. 24, 2016.

* cited by examiner

DISTRIBUTED REAL-TIME COMPUTER SYSTEM AND TIME-TRIGGERED DISTRIBUTION UNIT

The invention relates to a time-triggered distributor unit for distributing messages in a distributed computer system for safety-critical applications.

The invention likewise relates to a distributed real-time computer system consisting of a plurality of node computers and time-triggered distributor units.

With the advance of computer technology into safety-critical systems, for example, in the field of autonomous driving of motor vehicles, system technical measures must be taken to eliminate either the consequences of the error after the error occurs in a node computer or to automatically guide the system into a safe state. In the case of an autonomous vehicle, for example, a safe state is when the vehicle is stopped.

According to the prior art, a safety-critical system is controlled by a distributed computer system. A distributed computer system consists of node computers, which exchange messages over at least one distributor unit.

It is assumed below that all node computers and all distributor units have access to global time. According to the prior art [Kopetz, H., Real-time Systems—Design Principles for Distributed Embedded Applications, Springer Verlag, 2011], a fault-tolerant global time can be established by the communication system.

In the following and within the scope of this description, terms known in this field and in the literature are used, but these terms are still defined below to facilitate an understanding. The umbrella term "component" refers to a node computer or a distributor unit. A component is a "fault containment unit" (FCU) if the direct consequences of the cause of a fault are still limited exclusively to this component [Kopetz, see above, page 137]. The direct consequences of a fault of an FCU in a distributed computer system include the failure of an expected message or a flawed message. An FCU, which does not send a message in a fault incident, is referred to as a self-checking FCU (abbreviated SCFCU or fail-silent FCU). A self-checking FCU therefore sends either correct messages or none at all. An FCU that can send a flawed message in a time range or value range is referred to as a non-self-checking FCU (abbreviated NSCFCU) or a non-fail-silent FCU. A non-self-checking FCU can therefore send fast messages in the value range or in the time range in an error case.

The structure of a fault tolerant system is greatly facilitated if all the node computers are designed as self-checking FCUs [Kopetz, see above, page 156]. Since a self-checking FCU sends only correct messages or none at all, it is sufficient to provide a second parallel self-checking FCU to mask a failure of a self-checking FCU, in which case both self-checking FCUs will receive the same input data. In the fault-free case, two correct messages are produced by the two self-checking FCUs. If a self-checking FCU fails, a correct message will still be produced.

One possibility for implementing a self-checking FCU, which does not send a message after occurrence of a hardware fault, consists of a parallel calculation of the result by two identical redundant modular units and the subsequent comparison of results. If the results of the two modular units arranged in parallel are different, no result (no message) is output to the surroundings. However, the technical effort for implementation of such a self-checking FCU is more than twice as great as the effort for implementation of a non-self-checking FCU.

One possibility of implementing a self-checking FCU that recognizes software consists of a parallel configuration of two FCUs with different software based on the same object and a comparison of the results (software diversity). If the results of the two FCUs arranged in parallel are different, then no result (no message) is output to the surroundings. The technical effort for implementation of such a self-checking FCU is more than twice as great as the effort for implementation of a non-self-checking FCU.

If the software used in an FCU is so simple that it can be checked formally and/or tested comprehensively, then the assumption that design errors cannot occur during operation is justified. Software that can be check formally and/or tested comprehensively is known as "simple" software and a result that is calculated using "simple" software is known as a "simple" result. If "simple" software is used in an FCU, then a self-checking FCU need only recognize any hardware faults that occur.

In the field of safety engineering, the "envelope" (the technical limits within which an electronic system may be safely operated [Kariger, B., Fierro, D., Dictionary.com, URL: http://dictionary.reference.com]) of a "simple" result is understood to include the set of all results that meet all the safety-critical criteria and ensure a solution to the problem as formulated.

If the software used in an FCU cannot be checked formally and/or tested comprehensively, then the assumption that design flaws can occur during operation is justified. Software that cannot be checked formally or tested comprehensively is known as "complex" software and a result calculated using a complex software is known as a "complex" result.

In the field of safety engineering in aviation and aerospace technology, there is a precise differentiation between "simple" and "complex" in the FAA Advisor Circular AC no. 23.1309-1D [Jan. 16, 2009. URL: www.faa-aircraft-certification.com/support-files/ac-23-1309-1d.pdf].

If "complex" software is used in a safety-relevant system, then a self-checking FCU must not only recognize any hardware faults that occur but must also recognize software errors that can lead to a violation of a safety-relevant criterion. Within the context of system analysis, the application-specific safety-relevant criterion must be detected in a safety-relevant application and must be documented accurately. For example, a maximum dose must never be exceeded in a computer-controlled radiation treatment on a patient [Jacky, Johnatan, Safety-Critical Computing: Hazards, Practices, Standards, and Regulations, in: Computerization and Controversy: Value Conflicts and Social Choices, Ed. Kling, R., pp. 767-792, Academic Press 1996].

A flawed message of a non-self-checking FCU may either contain faulty payload information (English "payload") in the value range or may be faulty with regard to the time range, i.e., may occur at the wrong point in time.

In a time-triggered system, in which any message sequence of a node computer to a distributor unit consists of periodic messages that should arrive at the distributor unit at defined points in time, which were disclosed to the distributor unit a priori, the distributor unit can recognize and discard a message arriving at the wrong point in time from a non-self-checking FCU.

Since a flawed message in the time range from a non-self-checking FCU is recognized and discarded by a time-triggered distributor unit, this non-self-checking FCU appears to be a self-checking FCU with respect to flawed messages in the time range from the standpoint of the node computer receiving the message from a distributor unit.

Within the context of this description, the term "comparator" denotes a unit, which is also referred to as a "voter" in the literature and which discovers flawed messages and masks the error [Kopetz, see above, page 157].

An error in the payload information of a message sent by a non-self-checking FCU cannot be recognized by conventional time-triggered distributor units such as those available on the market.

One object of the present invention is to create a time-triggered distributor unit in a distributed computer system which can decide rapidly and with a justifiable effort whether there are any safety-relevant faults even in complex systems with very high safety requirements. Likewise, another object of the present invention is to create a distributed real-time computer system with a corresponding distributor unit.

The aforementioned objects are achieved with the distributor unit of the type defined in the introduction in which according to the invention the distributor unit is designed as a self-checking function unit and has input channels for receiving time-triggered periodic input messages from node computers upstream in the data flow and output channels for sending time-triggered periodic output messages to the downstream node computers in the data flow, and a comparator which is provided in the distributor unit is equipped to analyze the payload information contained in the input messages by means of a "simple" software and to decide whether output messages are output and, if so, which payload information is contained in the output messages.

It is expedient here if at one least one distributor unit, expanded by a contributor, is equipped to make the "choice" by means of the messages arriving from the upstream node computers in the case of a TMR configuration for masking a hardware fault occurring in a component upstream from the distributor unit.

It is also advisable if the distributor unit is equipped to carry out the time-triggered communication in accordance with the TTEthernet standard.

To also be able to tolerate a fail-silent fault of a distributor unit that has been enlarged by a comparator, it is advisable to provide a redundant distributor unit in a TMR configuration for masking the failure of a distributor unit that has been expanded by a comparator.

The present invention solves the problem of how an abstract function unit, whose behavior corresponds to that of a self-checking unit from the standpoint of safety, can be created by combining several node computers that are non-self-checking FCUs with a time-triggered distributor unit that has been supplemented by a comparator and is a self-checking FCU with respect to hardware defects. The distributor unit is implemented as a self-checking FCU with respect to hardware defects in order to interrupt processing and suppress the output of messages in the event a hardware fault occurs in the distributor unit.

According to the invention, the comparator of the distributor unit uses simple application-specific software to check on whether the payload information in the data transported via the distributor unit violates an application-specific, safety-relevant criterion and suppresses the output of messages violating such an application-specific, safety-relevant criterion. The non-self-checking node computers and a self-checking distributor unit, which has been expanded with a comparator, by means of which all the safety-relevant output messages of the node computers must be transported, thus form an abstract self-checking function unit from the standpoint of safety.

Figure 2:
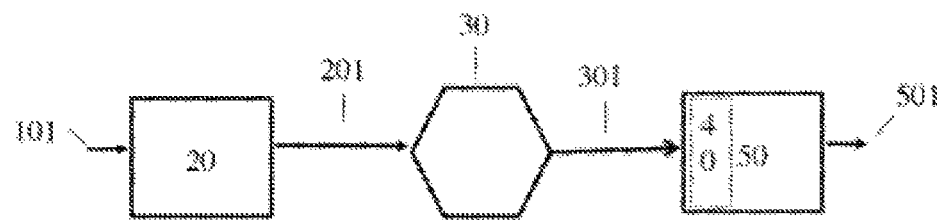
Figure 3:
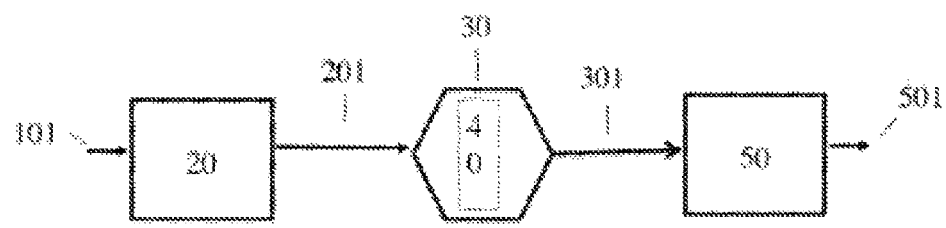
Figure 4:
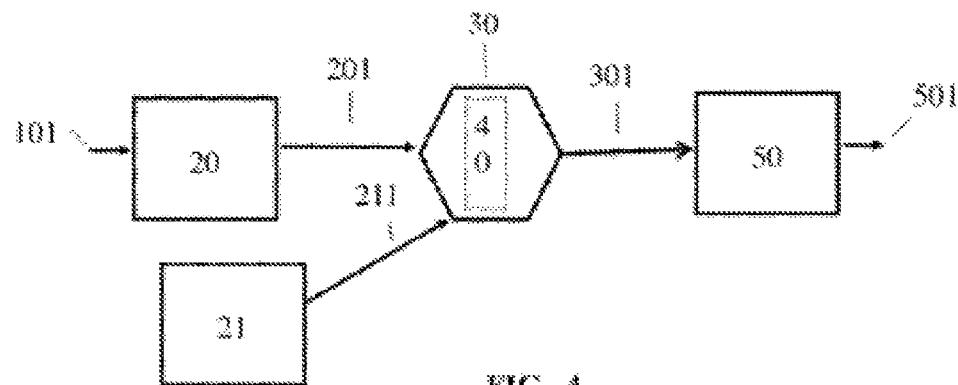
Figure 5:
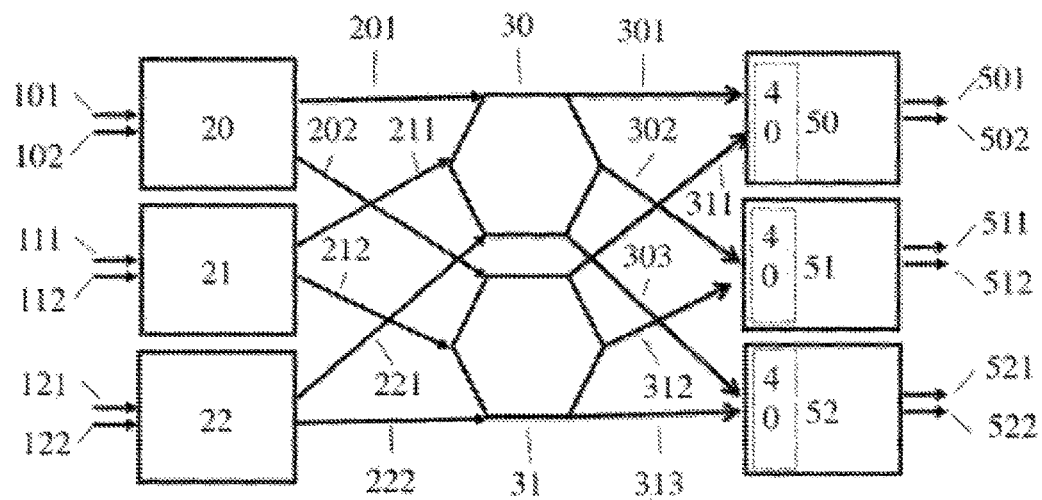
Figure 6:
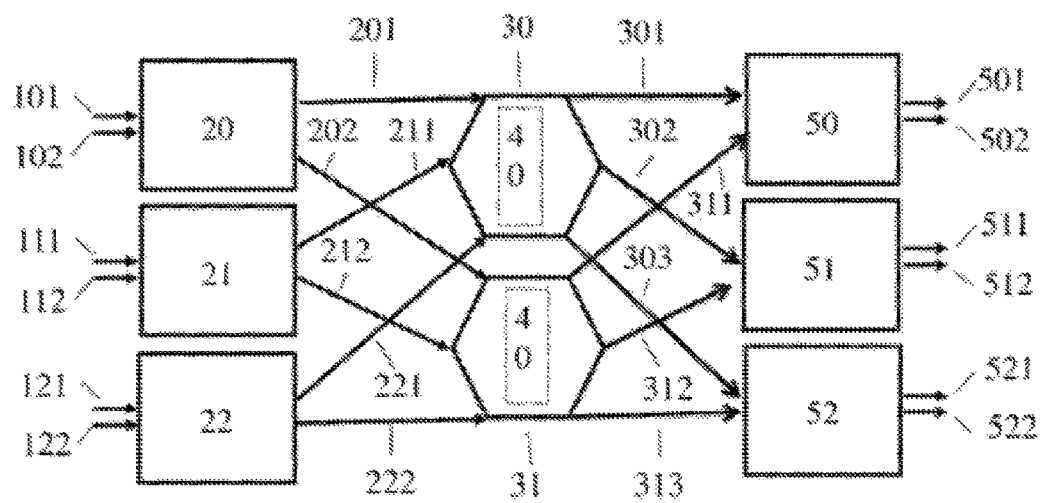

The invention plus some additional details and advantages are described below with reference to the drawings, in which:

FIG. 1 shows the data flow in a real-time system according to the prior art,

FIG. 2 shows the data flow in a real-time system according to the prior art, wherein the receiver checks on the safety-relevant criteria with the help of a comparator, FIG. 3 shows the data flow in a real-time system according to the invention, wherein the message distributor unit checks the safety-relevant criteria with a comparator, FIG. 4 shows the data flow in a real-time system wherein the message distributor unit checks the safety-relevant criteria wherein the comparator also takes into account dynamic process information, FIG. 5 shows the structure of a TMR (triple modular redundancy) system according to the prior art, and FIG. 6 shows the structure of a TMR system according to the invention, in which the distributor units are expanded by comparators.

FIG. 1 shows the structure of a directed data flow in a processing cycle in a real-time system according to the prior art. The behavior of most real-time systems is characterized by a periodic sequence of processing cycles. The directed data flow of a periodic processing cycle begins with the detection of the input data, the subsequent processing of the detected data by one or more node computers and ends with the output of the manipulated variables to the actuators. A node computer 20 receives the messages delivered on the communication channel 101 from a node computer that is upstream in the data flow and sends its result messages on the communication channel 201 to a time-triggered distributor unit 30, which is downstream in the data flow. The time-triggered distributor unit 30 promptly transports a message arriving from the node computer 20 upstream in the data flow to a node computer 50, which is downstream in the data flow, via a communication channel 301. A message not arriving promptly at the communication channel 201 is discarded by the time-triggered distributor unit 30. The node computer 50 sends its result messages over a communication channel 501 to the following downstream distributor unit or to an actuator.

It is advantageous if the distributor unit 30 implements the standardized time-triggered TTEthernet protocol [SAE Standard AS6802 of TT Ethernet, URL: http://standards.sae.org/as6802].

FIG. 2 shows essentially the same blocks as in FIG. 1 and likewise in a real-time system according to the prior art, but with a comparator 40 in the node computer 50. This comparator 40 checks with "simple" software on whether an application-specific safety-relevant criterion is violated in the payload information of the incoming message. If this is the case, then the message arriving on the communication channel 201 from the node computer 20 that is upstream in the data flow is discarded by the comparator 40.

FIG. 3 also shows the structure of a directed data flow in a processing cycle with essentially the same blocks as in FIG. 1 and/or FIG. 2, but according to the invention with a comparator 40 in the distributor unit 30. The comparator checks with "simple" software on whether an application-specific safety-relevant criterion is violated in the payload information of the incoming message. If this is the case, then the message is discarded by the comparator 40 in the distributor unit 30. The downstream node computer 50 thus does not receive a message because the function unit formed from the node computer 20 and the distributor unit 30 with respect to safety-relevant errors can be considered as an abstract function unit whose behavior corresponds to that of a self-checking FCU from the standpoint of safety.

FIG. 4 shows the structure of a directed data flow in a processing cycle with a comparator 40 in the distributor unit 30 in the sense of the invention, wherein the distributor unit receives an additional message from a node computer 21 pertaining to the dynamic state of the system on the communication channel 211. The comparator uses "simple" software to check on the payload information of the message received on the communication channel 201, taking into account the information received on the communication channel 211 and does not output any information on the communication channel 301 if the check reveals a violation of an application-specific safety relevant criterion.

FIG. 5 shows the structure of a TMR configuration according to the prior art (Kopetz, see above, page 157) for masking hardware defects in a distributed real-time system. Three replica deterministic instances 20, 21 and 22 of the node computer 20 illustrated in FIG. 1 process the incoming input data in parallel. In the fault-free case, the node computer 20 receives two identical redundant incoming messages over the communication channels 101 and 102 and sends the result messages over the communication channel 201 to the distributor unit 30 and over the communication channel 202 to the redundant distributor unit 31. Similarly, the node computer 21 receives two identical redundant incoming messages over the communication channels 111 and 112 and sends the result messages over the communication channel 211 to the distributor unit 30 and over the communication channel 212 to the redundant distributor unit 31. Similarly the node computer 22 receives two identical redundant input messages over the communication channels 121 and 122 and sends the result messages over the communication channel 221 to the distributor unit 30 and over the communication channel 222 to the redundant distributor unit 31.

In the fault-free case, the distributor unit 30 sends the identical messages received from the three node computers 20, 21 and 22 to the node computer 50 over the communication channel 301, to the replicated node computer 51 over the communication channel 302 and to the replicated node computer 52 over the communication channel 303. Similarly, the distributor unit 31 sends the messages received from the three node computers 20, 21 and 22 to the node computer 50 over the communication channel 311, to the replicated node computer 51 over the communication channel 312 and to the replicated node computer 52 over the communication channel 313.

In the fault-free case, each of the three node computers 50, 51 and 52 receives six redundant copies of a message. In the first step one of the two redundant copies of a message is discarded by a node computer. The remaining three messages are compared by the comparator 40 and only one message is forwarded with each item of payload information, which is identical in at least two of the three messages. The result data is forwarded to the downstream node computers over the redundant output channels. This process, which is carried out by the comparator, is referred to as the "choice" (English "voting") regarding the incoming redundant messages. The computer node 50 thus outputs the result messages to the distributor unit downstream in the data flow over the communication channels 501 and 502; the computer node 51 outputs the result messages over the communication channels 521 and 522, and the computer node 50 outputs the result messages to the distributor unit that is downstream in the data flow over the communication channels 521 and 522. Due to the redundant TMR configurations, a failure of one of three node computers 20, 21 or 22 and/or one of the two distributor units 30 or 31 is tolerated.

According to the invention, in a TMR system, the message traffic between the distributor units 30 and 31 and the node computers 50, 51 and 52 is reduced significantly due to the displacement of the comparator 40 into the distributor units according to FIG. 6, because the comparator 40 decides by a method similar to that illustrated in FIG. 5 which of the items of payload information contained in the input messages is transferred to the output message. The distributor units 30, 31 of FIG. 1 are thus implemented in the hardware with "simple" software on self-checking hardware. Instead of six messages, now only two messages are forwarded by the distributor units to the node computers 50, 51 and 52. The node computers 50, 51 and 52 are simplified because no selection of the redundant messages need take place in these node computers.

In applications in aerospace engineering, for example, reliability can be further improved, if necessary, by using more than the components shown in FIG. 6, for example, four node computers each on the input end and on the output end and three distributor units.

The invention disclosed here has major economic significance because this makes it possible to implement fault-tolerant computer systems in safety-relevant applications using conventional node computers and dedicated self-checking distributor units, which have been expanded by one comparator.

The invention claimed is:

1. A time-triggered distributor unit (30, 31) for distributing messages in a distributed computer system for safety-critical applications, the time-triggered distributor unit (30), which comprises a self-checking function unit, the time-triggered distributor unit comprising:
    input channels (201 . . . 222) for receiving time-triggered periodic input messages from node computers (20, 21, 22) that are upstream in a data flow;
    output channels (301 . . . 313) for sending time-triggered periodic output messages to the node computers (50, 51, 52) that are downstream in the data flow; and
    a comparator (40) configured to (i) analyze payload information contained in the time-triggered periodic input messages by using simple software, and (ii) decide whether the time-triggered periodic output messages are to be output and, if so, which payload information is to be contained in the time-triggered periodic output messages.

2. The time-triggered distributor unit of claim 1, wherein, in a triple modular redundancy (TMR) configuration for masking a hardware fault occurring in a component upstream from the time-triggered distributor unit, at least one distributor unit (30) which has been expanded by the comparator (40) is equipped to make a choice using the time-triggered periodic input messages arriving from the node computers (20, 21, 22) which are upstream thereof.

3. The time-triggered distributor unit (30, 31) of claim 1, which is equipped to carry out time-triggered communication according to the TTEthernet standard.

4. A distributed real-time computer system comprising:
    at least one time-triggered distributor unit according to claim 3, wherein a redundant distributor unit (31) is provided in a TMR configuration for masking a failure of the at least one time-triggered distributor unit (30) that has been expanded by the comparator (40).

* * * * *